United States Patent [19]
Hyatt et al.

[11] Patent Number: 5,540,526
[45] Date of Patent: Jul. 30, 1996

[54] FLUID BEARING TOOL AND A METHOD FOR FORMING THE SAME

[75] Inventors: Gregory A. Hyatt, Westchester; Scott J. Hrvatin, Mason, both of Ohio

[73] Assignee: LeBlond Makino Machine Tool Company, Mason, Ohio

[21] Appl. No.: 301,862

[22] Filed: Sep. 6, 1994

[51] Int. Cl.$^6$ .................. B23B 35/00; B23B 41/12
[52] U.S. Cl. .................. 408/1 R; 408/54; 408/57; 408/708
[58] Field of Search .................. 408/1 R, 54, 56, 408/57, 708

[56] References Cited

U.S. PATENT DOCUMENTS

| | | | |
|---|---|---|---|
| 3,317,216 | 5/1967 | Muthler | 408/56 |
| 3,438,287 | 4/1969 | Kampmeier et al. | |
| 3,438,288 | 4/1969 | Kaiser | |
| 3,438,289 | 4/1969 | Kampmeier | |
| 3,540,319 | 11/1970 | Greenberg | 408/56 |
| 3,570,191 | 3/1971 | Williams | |
| 3,899,222 | 8/1975 | Mendelevsky et al. | |
| 4,693,642 | 9/1987 | Mair et al. | 408/708 |
| 4,701,081 | 10/1987 | Hashimoto et al. | 408/54 |
| 5,221,165 | 6/1993 | Goszczynski | 408/57 |

FOREIGN PATENT DOCUMENTS

| | | | |
|---|---|---|---|
| 4504 | 1/1987 | Japan | 408/54 |
| 33210 | 4/1991 | Japan | 408/708 |
| 337713 | 12/1993 | Japan | 408/57 |

*Primary Examiner*—Daniel W. Howell
*Attorney, Agent, or Firm*—Dinsmore & Shohl

[57] ABSTRACT

An improved tool and method for the machining (e.g., boring, cutting, grinding and the like) of a workpiece. The tool includes a body that can be connected in a cantilevered arrangement to a machine for rotating machining operations and has fluid distribution channels formed in the body in a predetermined arrangement. The tool also includes a machining surface and at least one bearing surface formed on the peripheral surface of the tool. Pressurized fluid is provided through the fluid distribution channels in use, which, enable creation of a fluid bearing between the tool and an opening in the workpiece which has been machined by the tool. In addition, the tool can also include additional fluid distribution openings for cooling and cleaning of machining surfaces.

19 Claims, 4 Drawing Sheets

5,540,526

FLUID BEARING TOOL AND A METHOD FOR FORMING THE SAME

TECHNICAL FIELD OF THE INVENTION

The present invention relates generally to fluid bearings for tools and spindles, and more particularly to a cantilevered rotating cutting tool for boring operations and the like, and featuring an internal passage configured to route pressurized fluid along the tool to enable the automatic formation of one or more fluid bearings in conjunction with a workpiece for supporting the tool in use.

BACKGROUND OF THE INVENTION

In the tool industry, it is common to provide a fluid bearing for use to assist in supporting tool components during boring, drilling, reaming or other machining operations. Advantages for utilizing such bearings are created since a pressurized fluid film normally separates the components and prevents physical contact, that, in turn, reduce physical wear and tear on the tool components used in the machining operations. Establishing a fluid bearing also permits operating components at increased rotational speeds without negatively affecting accuracy, reduces the influences of contamination (e.g., particles or chips abrading the surfaces), allows for increased loads to be placed on a tool, and further controls thermal energy.

A fluid bearing is a system in which moving components, such as a rotor in a tool assembly, are physically separated from the non-moving components (e.g., a stator) by a load carrying film of pressurized fluid. By controlling fluid pressure, the components (e.g., the rotor) in the bearing can be supported to assist in maintaining tool rigidity and to minimize wear on the components. To achieve the film "floating effect" in a fluid bearing, a certain amount of pressurized fluid must generally be permitted to drain or leak from the fluid bearing, and thus, it is necessary to replace these fluids lost in order to maintain the supporting pressures within the fluid bearing.

In the past, pressurized fluids have been delivered to the bearing chamber between the stator and rotor through passages in the stator. Examples of these arrangements are shown in U.S. Pat. No. 3,438,287 to Kampmeier, et al., U.S. Pat. No. 3,488,288 to Kaiser, and U.S. Pat. No. 3,438,289 to Kampmeier, wherein fluid flows through the stator and is directed inwardly toward the rotor to provide a fluid bearing in the pressure pads and space between a spindle and its bushings in two hydrostatic bearing supports positioned at opposite ends of a workpiece. Seemingly, the supports at opposite ends of the workpiece are required to create a hydrostatic bearing to effectively support the rotor.

If the workpiece must be transported from machine to machine (as is often the case where multiple machining operations are required), a stator supplying fluid for the fluid system would have to accompany the workpiece as it is moved. These structural requirements could possibly require an extensive and complex network of supply hoses so that fluid communication could be established and maintained once the workpiece was set up on the next machine, or alternatively, each would require severing fluid communication to the stator, moving the stator, and the reestablishing fluid communication to the stator. These steps are burdensome, labor intensive, time consuming and increase the overall cost of machining, or of the machine itself.

As can be seen, currently available machining tools that require fluid bearings have a number of shortcomings which greatly reduce the flexibility and versatility of these tools. Moreover, current machining operations demand tool systems which can operate at increased rotational speeds or revolutions per minute "rpm" to achieve desired levels of performance and results. The cumbersome structural and hydraulic arrangements heretofore available are not easily adapted for high production applications, and are increasingly incompatible in modern manufacturing processes. The industry currently lacks a machining tool which is usable in a quick change tool center that can operate at increased speeds, and that can form a transient fluid bearing in the bore hole of a workpiece for a machining tool, especially a boring tool with an extended length.

SUMMARY OF THE INVENTION

It is an object of the present invention to provide a tool and a process for establishing a fluid bearing that addresses and overcomes the above-mentioned problems and shortcomings in the tool industry.

It is also an object of the present invention to provide a fluidly supported tool that can be used with a quickly or automatically changeable tool system.

It is another object of the present invention to provide a tool that can utilize the bore hole in a workpiece to establish a temporary fluid bearing chamber.

It is still another object of the present invention to provide a fluidly supported tool that can operate at increased rotational speeds.

Another object of the present invention is to provide a tool that routes fluid to a remote fluid bearing and also routes fluid in close proximity to the working surface to wash away particles.

It is an object of the present invention to provide a fluidly supported tool that dissipates thermal energy from the rotor and stator.

It is another object of the present invention to provide a tool where the tool is supported and centered in use using a remote fluid bearing. It is still another object of the present invention to provide a process for establishing a fluid bearing that is able to handle greater loads.

It is yet another abject of the present invention to provide an improved tool which is configured for machining operations or the like, and which includes structure for enabling the provision of one or more remote fluid support bearings between the tool and a workpiece upon which the tool is working.

Another object of the present invention is to provide a tool that has a reduced need for mechanical guide pads.

Additional objects, advantages and other features of the present invention will be set forth and will become apparent to those skilled in the industry upon examination of the following, or may be learned with practice of the invention.

To achieve the foregoing and other objects, and in accordance with the purpose herein, the present invention comprises an improved tool for the machining (e.g., boring, cutting, grinding and the like) of a workpiece. The tool includes a body that can be connected in a cantilevered arrangement to a machine for rotating machining operations and has fluid distribution channels formed in the body in a predetermined arrangement. The tool also includes a machining surface on at least a portion of the peripheral surface of the tool for machining a workpiece in use, and also at least one bearing surface formed on the peripheral surface of the tool so pressurized fluid can be provided through the fluid distribution channels in use, which, enable establishment and maintenance of a transient fluid bearing between the tool and an opening in the workpiece. In addition, the tool also includes additional fluid distribution openings for cooling and cleaning of machining surfaces while in use.

The tool of the present invention can be used with a machine station that includes a machine spindle for rotating machining operations, a device for securing the tool body in a cantilevered arrangement, a workhead to be machined by the tool, and an arrangement for moving the workhead relative to the spindle. In an alternative embodiment, the combination of the tool and machine also includes an auxiliary bearing support fixture independent of both the workpiece and machine spindle, which can be movable.

The present invention also includes an improved method for machining a workpiece. A rotary tool is connected with a machine spindle and fluid communication is provided between a source of pressurized fluid and distribution channels formed in the tool. Next, an opening in the workpiece is machined with the tool, and then the tool is fed through the machined opening to align a bearing surface with the machined opening, which in turn establishes a transient fluid bearing between the tool and the machined opening.

In an alternative embodiment, the method also includes machining another opening of the workpiece while the tool is supported by the transient fluid bearing between the tool and the workpiece. In still another alternative embodiment, an auxiliary bearing support fixture independent of the workpiece and spindle can be provided with a bore of predetermined diameter to form an additional transient fluid bearing.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENT

Figure 1:
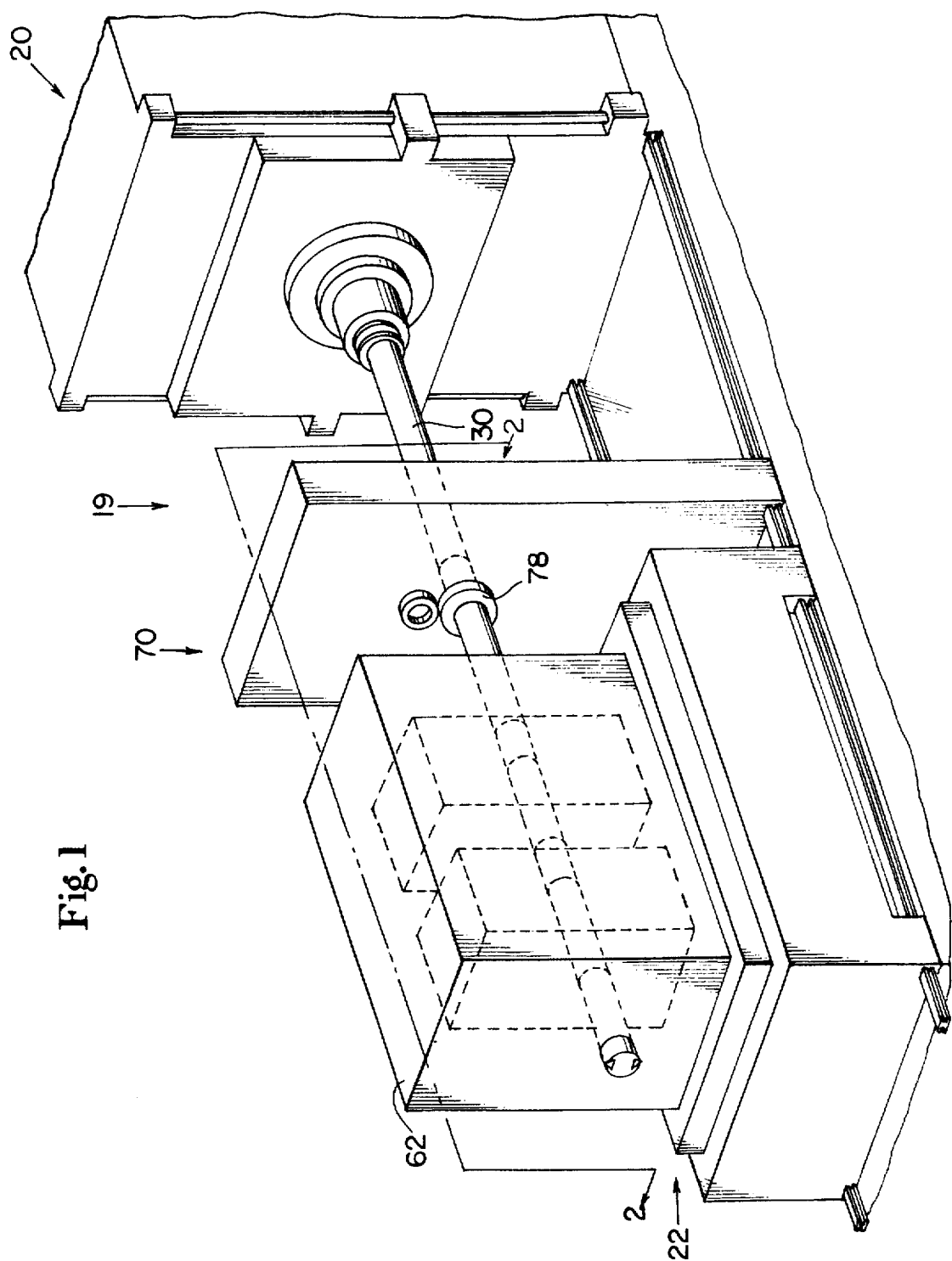
FIG. 1 is a fragmentary perspective view of a tool incorporating the tool and process of the present invention.

Referring now to the drawings figures in detail wherein like numerals indicate the same element throughout the views, FIG. 1 illustrates work area 19 having a machine station 20, such as a precision metal cutting machine, that is commonly used for machining holes or the like in a workpiece 62, that is generally mounted and secured to a workhead 22 using apparatus such as a fixture and other techniques known in the industry.

Figure 2:
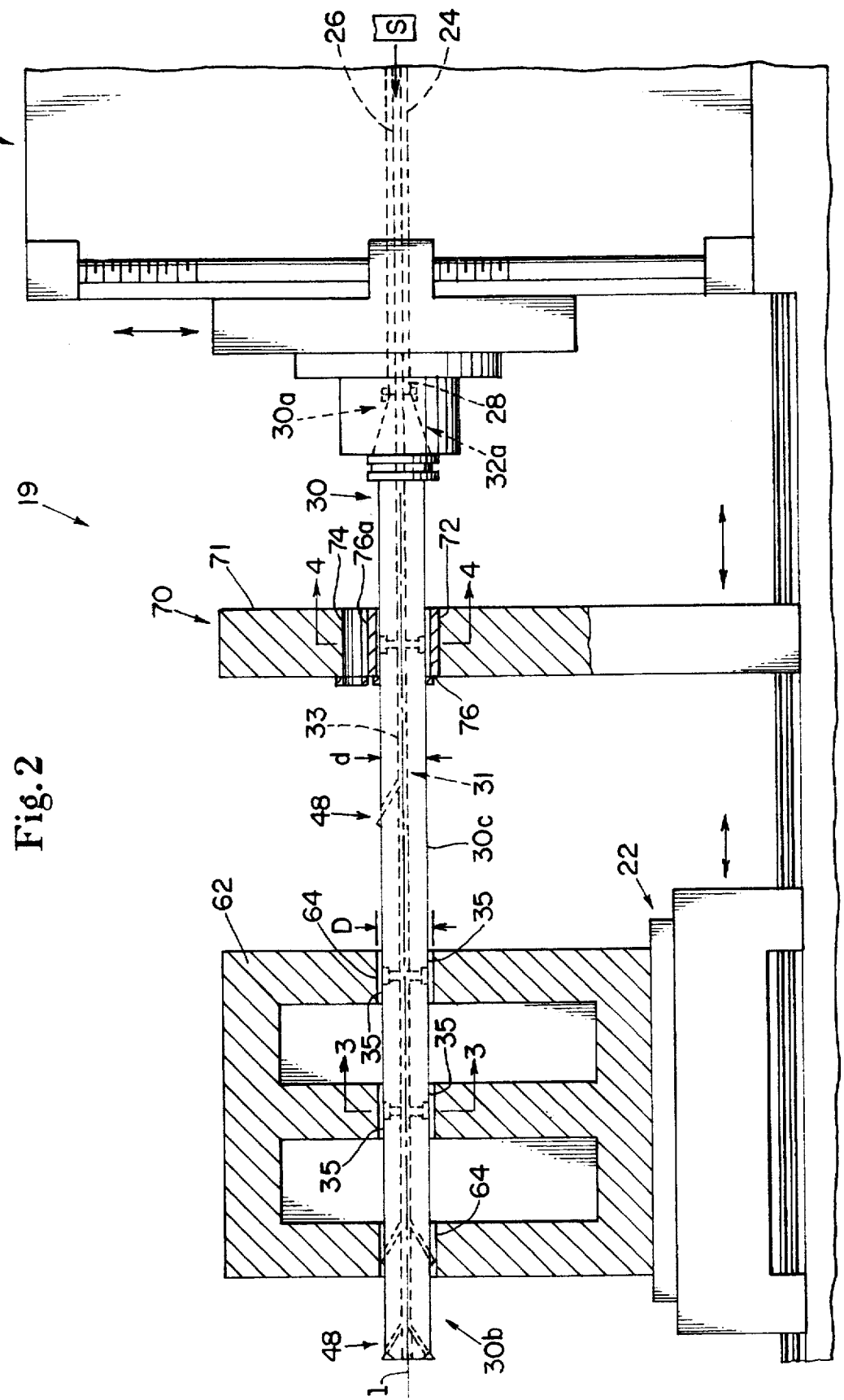
FIG. 2 is a fragmentary cross-sectional view of the tool of FIG. 1 taken along lines 2—2 thereof illustrating a preferred arrangement and for routing fluid to remote and transient fluid bearings.

Machine station 20 typically comprises a machine spindle 24, best seen in FIG. 2, which can be rotated at varying speeds by a power source (not shown), and which also can be adapted for quickly and easily receiving and securing one of a plurality of tools, such as tool 30. A synchronized system, such as an automatic tool changer (not shown) for interchanging and utilizing multiple tools, is often used to give the machine station 20 a greater range of operations (i.e., the station will not be dedicated to a single operation or use of a single type of tool). Any means for engaging (i.e., clamping onto or otherwise securing) the proximal end 30a of a tool (e.g. 30) in a generally cantilevered fashion to a machine spindle 24, such as a collet or mandrel device, can be used. It is preferred that the means for engaging the tool 30 be further configured to allow the automatic establishment of fluid communication of the tool 30 with a source of coolant/cutting fluid at the machine/tool interface 28, as will be explained in further detail below.

A preferred embodiment of the tool 30 has a fluid supply S that provides a source of pressurized fluid that can be routed internally through both the machine spindle 24 (e.g., via machine spindle passage 26) and the tool 30 (e.g., via fluid distribution passageway 31).

FIG. 2 illustrates a preferred embodiment where coolant/ cutting fluid is routed internally through machine spindle 24 and tool 30. In the embodiment illustrated, the machine spindle passage 26 has a distal end which sealingly interfaces with the proximal end 32a of the fluid distribution passageway 32 at the interface 28, whereby fluid communication can be automatically established upon attachment of the tool to the spindle, and maintained between the machine spindle passage 26 and the fluid distribution passageway 32 during machining operations. A seal might be provided in a variety of structural arrangements, including O-ring type seals and the like, and the exact configuration of establishing such fluid communication may vary among the particular embodiments. It should be noted that when tool 30 is not engaged with machine spindle 24, shutoff valving mechanisms known in the industry can be used to terminate the flow of fluid through interface 28.

Tool 30 preferably comprises a body 31 having a peripheral surface 30c that can be used in machining operations, such as deep boring operations, where the structure is made of a rigid material configured in a longitudinally extended generally cylindrical shape having a longitudinal axis "l". Illustrative examples of materials that can be used for tool 30 include various metals such as aluminum, steel or the like, or ceramic. For example, aluminum is a preferred material if there is a need for a lighter weight tool, such as, which might be preferred when tool 30 is interchanged in spindle 24 using an automatic tool changing system. The peripheral surface 30c typically has been surface hardened and/or coated for abrasion and wear resistance so that tool 30 could be used with dry or intermittent fluid delivery, and so that any abrasions on the peripheral surface 30c which might be caused by debris and recently cut particles can be minimized.

Preferably formed within tool 30 is a supply tube 33 that extends along the longitudinal length of tool 30. Both the tool 30 and the supply tube 33 are preferably oriented so they share the same center longitudinal axis of rotation. Such coaxial alignment facilitates interchanging of similar tools, such as 30, in machine spindle 24 (i.e., securing the tool 30 in place and establishing fluid communication between the spindle passage 26 and fluid distribution passageway 32) and maintains vibrations of tool 30 to a minimum during rotation (i.e. the tool and spindle remain substantially balanced in use). In this regard, off-centered routing of supply tube (or supply tubes) 33 and passageway 32 within tool 30 could likewise be employed, but in such cases it would be preferred to make such tubes symmetrical within tool 30 to preserve substantial balance for high speed rotation. Forming a fluid distribution passageway 32 in tool 30 and having fluid routed therethrough also provides an effective heat sink to dissipate thermal energy generated by rotation of tool 30 and machining operations which, in turn, minimizes undue thermal expansion of tool 30.

Figure 3A:
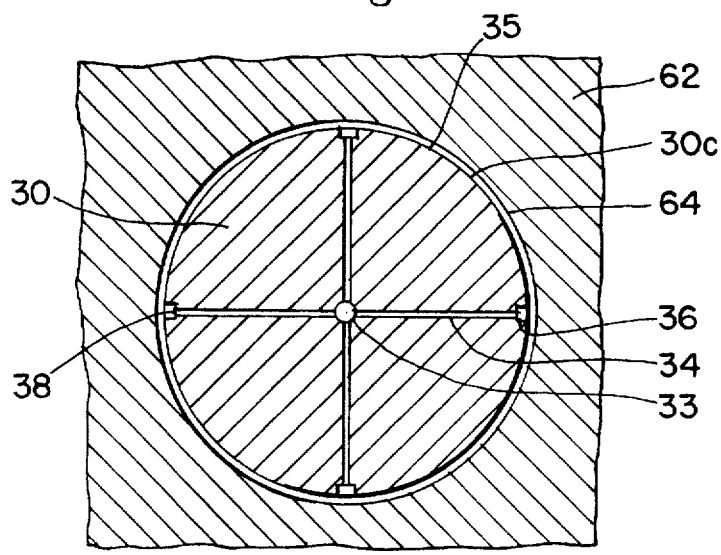
FIG. 3a is a partial, enlarged cross-sectional view of a fluid bearing formed in the bore hole of the workpiece of FIG. 2 taken along line 3—3 thereof.
Figure 3B:
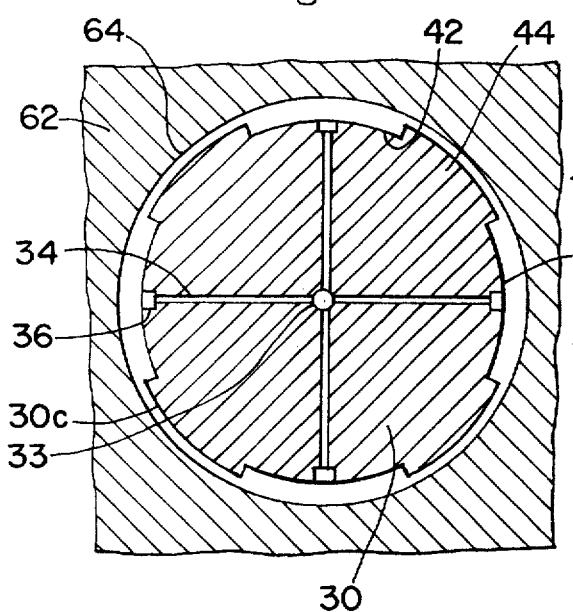
FIG. 3b is a cross-sectional view similar to that shown in FIG. 3a and illustrates an alternative embodiment of the fluid distribution structure of the tool.

If tool 30 were to undergo significant or uncontrolled thermal expansion, and particularly in a radial direction, the outer diameter of machine spindle 30 would increase, thus reducing the predetermined distance or space between the peripheral surface 30c (outer diameter of the tool 30) and the inner diameter of the bore hole 64 (known as the clearance or land clearance) as best seen in FIGS. 3a–b, or between the peripheral surface 30c and the inner diameter 76a of bushing 76, as best seen in FIGS. 4a—d. The distance provided between peripheral surface 30c and the inner diameter of bore hole 64 is preferably kept substantially small but constant (e.g., between about 5 to 20 microns). Thermal expansion of tool 30 could result in portions of these components rubbing against each other causing wear and tear on the peripheral surface 30c and the inner diameter 76a of the bushing. Ultimately, the thermal expansion could result in the components becoming friction welded together. Additionally, the reduction in the clearance can reduce the rate of flow or velocity of fluid leakage, which in turn, could stifle chip evacuation. It is important to remove recently cut chips and other debris from the clearance quickly to reduce the possibility of the tool surface or the bore hole finish being abraded or otherwise degraded. A reduction in the size of the clearance also reduces the volume of fluid in the fluid bearing, and decreases the rate at which thermal energy is dissipated. As will be explained, the present invention provides structural and process features which can prevent these problems.

Turning now to FIG. 3a, an enlarged cross sectional view of tool 30 is illustrated wherein counterbores 36 are formed in the peripheral surface 30c and are spaced at predetermined intervals along the working length of tool 30 (seen best in FIG. 2) and radially around the peripheral surface 30c of tool 30 adjacent bearing surface 35. As will be understood, the outer diameter of peripheral surface 30c will be predetermined in the bearing surface 35 portions to provide the optimal clearance (e.g., 5 to 10 microns) between a workpiece bore machined by the machining surface(s) of the tool in order to enable establishment of the transient bearings of the present invention. Fluid distribution passageway 32 preferably includes a plurality of fluid manifolds 34, each extending radially inwardly from a counterbore 36 and in fluid communication with supply tube 33. Manifolds 34 are designed to deliver fluid to adjacent the bearing surface 35, and are preferably angularly oriented at an angle of between about 90° to nearly 0° with respect to the tangent of peripheral surface 30c. At reduced rotational speeds of tool 30, turbulence within the resulting fluid bearing and shearing of the fluid is tolerable and not problematic, and as such, the manifolds 34 can be provided with an angular orientation that approaches a 90° angle with respect to the tangent of peripheral surface 30c. However in applications where increased rotational speeds of tool 30 are necessary or desirable, the manifolds 34 can be provided with angular orientations which approach a 0° angle with respect to tangent of peripheral surface 30c, which reduces turbulence and the shearing of fluid within the fluid bearing.

The bearing surface 35 spaced on the peripheral surface 30c on tool 30 enables one or more transient fluid bearing to be provided in the workpiece 62, such as in bore hole 64, as tool 30 machines one or more other spaced bores in a workpiece 62. As used herein, the term "transient" is used to connote and emphasize the fact that the unique structure and method of the present invention allows for the establishment of one or more fluid bearings automatically between the tool and an opening in the workpiece which has been machined by the tool itself. Consequently, the location and number of the fluid bearings actually established at any one time in use depends on the workpiece configuration and the structure and use of the tool on that workpiece. A workpiece to be worked by a tool of the present invention can be substantially hollow, substantially solid, or a combination thereof. As mentioned, in use, transient fluid bearings are automatically established by aligning the bearing surface 35 in a bored hole 64 and supplying fluid under pressure via the tool 30, as will be explained in greater detail later. As more machining operations are performed on workpiece 62, additional transient fluid bearings can be automatically established in the workpiece 62 by following the same steps since the tool 30 is self contained and itself routes fluid to the bore hole 64. Providing a self-contained tool 30 reduces the need for additional structures to establish and maintain fluid bearings, as tool 30 can progressively establish its own fluid bearing support as it works through a workpiece, or several aligned workpieces.

While counterbores 36 can be used to align and facilitate formation of the manifolds 34, such as by allowing access for drilling or boring operations, they can also provide recesses for mounting and securing a flow control device or meter 38. The rates, velocity (e.g., the pressure) and direction of fluid flow through manifolds 34 can preferably be controlled by inserting properly sized and configured flow meters 38, such inverted hypodermic needles, readily available jets for carburetors, or custom shaped orifices or valves, into respective counterbores 36. Utilization of replaceable flow meters 38 makes interchanging, replacement and maintenance more simple, and allows fluid flow rates and direction to be varied, as desired.

The ability to control fluid flow rates becomes especially important as the working length of tool 30 increases. As can be appreciated by viewing FIG. 2, the counterbores 36 and corresponding flow meters 38 and fluid manifolds 34 positioned closer to the proximal end 30a of tool 30 must be more restrictive to the fluid flow than those counterbores 36 and flow meters 38 positioned closer to the distal end 30b of tool 30 to create an appropriate back pressure for controlling the fluid distribution and pressure within passageway 32 and to route fluid at a predetermined flow rate and pressure along the working length of tool 30.

In certain situations, it is contemplated that flow meters 38 selected for allowing different flow rates of fluid therethrough could be used in one or more of the counterbores 36 located around the peripheral surface 30c at any particular longitudinal position of tool 30 along longitudinal axis "l".

For example, when a rotor, such as tool 30, is not manufactured absolutely symmetrically (i.e., with a circular outer diameter), it is contemplated that appropriate "tuning" of the manifolds 34 could effectively minimize minor irregularities without adversely effecting tool performance. Use of an irregular tool 30 in precision machining operation can result in the tool 30 rotating in an unstable manner and/or "whipping" around. In these situations, flow meters 38 with varying flow rates could be positioned in selected counterbores 36 to effectively center tool 30 while it is rotating.

Returning now to FIG. 2, the fluid distribution passageway 32 is also illustrated as including a plurality of cooling tubes 40 oriented inwardly from peripheral surface 30c and proximally in tool 30. The outer end of each of the tubes 40 is similarly configured as a counterbore 36, and a properly sized flow meter 38 can be inserted therein to likewise control the flow of fluid. Cooling tubes 40 are designed to deliver fluid in close proximity to the machining edges or surfaces 48 formed on one or more portions the outer periphery 30c, and are preferably angularly oriented to wash away recently cut particles and to dissipate heat energy generated by machining operations of the tool 30.

It is contemplated that along the longitudinal length of tool 30, especially in areas in close proximity to machining edges or surface 48, the outer diameter d of tool 30 will preferably be slightly smaller that the outer diameter D of such bearing surfaces. This diameter change in tool 30 can be accomplished by forming an angled (e.g. about 90°) depression step in the tool 30. The consequently larger volume of the clearance adjacent to outer diameter d results in more fluid therein, which, in turn, enables thermal energy to be dissipated at an increased rate. In addition, as recently particles of workpiece 62 are evacuated from the clearance, the larger volume area reduces the possibility of these particles abrading and damaging the outer periphery 30c or the inner diameter of bore hole 64.

In another embodiment, providing a tool 30 with a portion having a narrower diameter d in close proximity to machining surface 48 can facilitate passage of the machining surface 48 through a bore hole (e.g. 64). In such an embodiment, typically each machining surface 48 comprises only one cutting edge, milling tooth, or the like protruding from the peripheral surface 30c at a longitudinal position along tool 30. To pass a machining surface 48 through a bore hole (e.g. 64), the rotation of tool 30 is terminated, and the tool can then be moved or shifted so that its axis of rotation is not aligned with center of the bore hole (e.g. 64). Then, tool 30 can be moved with respect to the workpiece 62 through the bore hole. Once the machining edge (e.g. 48) is completely through the bore hole, the tool 30 is recentered on the center axis of the bore hole for further machining operations and to establish transient fluid bearings. It should be noted that the workpiece 62 can move or shift in lieu of moving tool 30, or both the tool 30 and workpiece 62 could move with respect to each other to provide the necessary movement required to pass the machining surface 48 through the bore hole.

FIG. 3a illustrates an example of where bore hole 64 formed in workpiece 62 by machining edge or surface 48 of tool 30 can then be used as a fluid bearing chamber for a remote or transient fluid bearing to support tool 30 during further machining operations. Fluid is routed to the bore hole 64 through tool 30 as previously discussed, and fluid pressure resulting form such flow creates a substantially uniform pressurized fluid film between tool 30 and bore hole 64, thereby creating a fluid support bearing.

As seen in FIG. 3b, fluid support pads 42 can optionally be formed on the peripheral surface 30c at selected intervals along the longitudinal length of tool 30, and most preferably along portions having the slightly larger outer diameter D mentioned above. The pads 42 are typically centered around one more counterbores 36, so that each of the pads 42 can collect a pool of fluid flowing from fluid manifold 34 and through flow meter 38 and the desired pressure level can be established and maintained in the bore hole 64. In the embodiment illustrated in FIGS. 2 and 3, pads 42 are formed at equally spaced positions in the peripheral surface 30c, with each pad 42 receiving fluid from at least one fluid manifold 34. It is contemplated that in order to ensure maintenance of a pressure level sufficient to keep the fluid bearings functioning as desired, pads 42 could receive fluids from more than one fluid manifold 34. As will be discussed later, the preferred number, spacing, size, and configuration of pads 42 can be determined for any particular application in accordance with fluid properties (e.g., fluid pressure, volume, temperature, or viscosity), the land clearance, and the rotational speed of tool 30.

Pads 42 are typically configured in a rectangular shape so that the leakage or evacuation path of the fluid will not vary significantly along the longitudinal length of tool 30. If the leakage path of the fluid were to vary, then fluid draining could cause turbulence and disrupt the balance and centering of tool 30 within its transient fluid bearing(s).

When pads 42 are formed in tool 30, reciprocal raised lands 44 are, or course, also provided on the peripheral surface 30c in order to define pads 42. Lands 44 are a physical structure providing resistance to and restrict the flow of fluids in all directions to control the rate of leakage from the bore hole 64 so that the pressure level within can be maintained at the desired level without requiring undesirable volumes of fluid.

Because a transient fluid bearing can be established with the least amount of fluid and fluid pressure when lands and pads are present, they are generally preferred wherever applicable. There are applications, however, where pads and lands cannot easily be provided, such as where boring stroke length is relatively long. In such cases, it may not be practical to use pads and lands, as the resulting bearing pads would be moved longitudinally through the corresponding bore hole during the machining stroke, causing the resulting fluid bearing to lose effectiveness or reliability. Similarly, at higher rotational velocities, providing pads 42 and lands 44 in tool 30 can create undue turbulence within the fluid bearings, and can cause undesirable shear of the fluids, which in turn, can reduce the machining accuracy of tool 30.

In an alternative embodiment where increased rotational speeds of tool 30 are required, pads 42 with reduced radial length around tool 30 can be provided to enhance stability of tool 30. The edges where the land 44 and pad 42 meet cause shear of the fluid which, in turn, provides a pressure point adjacent to each of the trailing edges of the respective pad 42 that actually enhances the self-centering effect on tool 30 in the fluid bearing.

In use, the present invention can be used to establish transient fluid bearings, such as hydrostatic bearings, hydrodynamic bearings, and combinations thereof between and tool and a workpiece. The transient fluid bearing formed by the tool 30 can be is utilized to support and center a tool 30 as it completes further boring or otherwise works on a workpiece 62. As described above, the present invention contemplates a process for machining (e.g., grinding, milling or boring) holes 64 in workpiece 62, where the tool 30 comprises a self-contained system having machining edges 48 and a fluid distribution passageway 32 for routing fluid in close proximity to bore hole 64, to establish and maintain at least one transient fluid bearing, and also for delivering fluid in close proximity to machining edges 48 to wash away particles and cool the workpiece 62 and tool 30.

Any type of coolant/cutting fluids can be used with the present invention including pure oil fluids and water based fluids with between about 5 to 10% emulsified oils (e.g. lower oil content fluids). At increased rotational speeds of tool 30, emulsified oil fluids are preferred because they are less likely to shear in a fluid bearing and are less likely to generate undesirable thermal energy in the fluid bearing. Oils, however, are preferred for high performance results when lower rotational speeds of tool 30 can be utilized.

As shown in FIG. 1, it is contemplated that workpiece 62 will be mounted and secured to a workhead 22 using devices and techniques known in the industry. Workpiece 62, workhead 22, and tool 30 are positioned or arranged so that tool 30 can work on the workpiece, such as to grind bore holes 64 as discussed herein. Once the tool 30 is properly positioned respective to workpiece 62, fluid from a pressurized source begins to flow through fluid distribution passageway 32, and more specifically through supply tube 33, which leads to fluid manifolds 34 and cooling tubes 40 and their respective counterbores 36.

It will be appreciated that due to the dynamics of fluid flowing radially outwardly through the rotating tool, and the energy required to change the velocity of the fluid (e.g., accelerate and decelerate), a stiffer fluid bearing for tool 30 is provided with a present invention. For example, when an increased load is applied at a specific radial position on tool 30, typically the fluid bearing compensates for the load by supplying more fluid to the area with an under-pressure and, conversely, less fluid to the area with a greater pressure level, especially when fluid is supplied from a non-rotating object. However, when fluid is supplied from within a rotating object, more energy is required to change the velocity of fluid flow through the rotor (e.g., tool 30) as the tool and fluid are equally rotating, especially at increased rotational speeds as contemplated in a machine tool operation. Consequently, fluid is supplied at a substantially more even flowrate radially around the rotor, which, in turn, provides a more stiff fluid bearing.

Once proper fluid distribution through passageway 32 is achieved, infeeding of tool 30 with respect to workpiece 62 is undertaken as tool 30 rotates for machining (e.g., grinding, cutting, boring, or the like) of hole 64. Once the desired machining operation is completed, the tool 30 infeeds again with respect to workpiece 62 and a bearing surface of tool 30 is aligned with the newly bored hole 64 so that a transient fluid bearing can be automatically established and maintained during subsequent machining operations in workpiece 62.

Fluid exits fluid distribution passageway 32 through flow meters 38 into the bore hole 64 to provide the fluid bearing that supports and centers tool 30 while it operates to, for example, bore at least one other bore hole positioned either proximal or distal to that fluid bearing. Thus, a transient fluid bearing is formed by tool 30 in conjunction with the workpiece hole 64 as further machining is undertaken by tool 30.

As discussed previously, a fluid bearing operates as a system in which pressurized fluid is continually being supplied to the bore hole 64 to maintain the desired pressure as controlled leakage or evacuation occurs. Fluid can flow axially or circumferentially to drain or leak out bore hole 64, taking with it debris and products of the machining operation.

As mentioned previously, it is contemplated that a plurality of fluid bearings can be formed in a workpiece 62 in the respective bore holes 64 machined by tool 30. As the tool 30 is progressively longitudinally fed into workpiece 62, the steps for establishing a fluid bearing can be repeated, which allow for a series of successive machining operations to take place and additional transient fluid bearings to be formed without reconfiguring the structure necessary to supply fluid for maintaining a transient fluid bearing.

Referring back to FIG. 1, an embodiment of the present invention can also optionally utilize an auxiliary fluid bearing support structure 70, illustrated in a support position between the tool station 20 and workpiece 62. It is also contemplated that structure 70 could also be positioned outboard of workpiece 62 (i.e. adjacent the distal end 30b of tool 30 in use). Structure 70 includes an outer upstanding casing 71 preferably longitudinally reciprocally mounted adjacent the workhead 22 and work station 20. Support casing 71 has one or more tubular sleeves (e.g. sleeves 72 and 74) extending completely through casing 71. Other embodiments of structure 70 might include varied numbers of sleeves or support beams in a variety of formations, depending on the needs.

A bushing 76 is sized and configured to be axially received in either of tubular sleeves 72 and 74, respectively, and any means known in the industry for securing a bushing 76 in a sleeve to prevent relative movement of bushing 76 can be used. FIG. 1 illustrates use of a collar 78 attached and secured bushing 76 to the outer face of casing 71.

It is important for bushing 76 to be exchangeably secured within sleeves 72 and 76, so that bushings of different size and capacities can be substituted for use with tools (30) of varying diameters and configurations. As will be appreciated in the art, the bushing 76 used with a particular tool 30 should be sized and configured so that the land clearance is a relatively small distance, such as between about 5 to 20 microns, so that a functional fluid bearing can be established and maintained therebetween. Bushing 76 might alternatively be a split bushing for further ease in assembly and/or movement in use.

Grooves 84 can also be sized and configured in the inner diameter 76 of bushing 76 to allow for passage of a machining edge 48 through bushing 76. In an alternative embodiment, when grooves 84 are not provided, machining edge 48 can be passed through bushing 76 by stopping the rotation of tool 30 and moving tool 30 with respect to workpiece 62 so that it passes completely through bushing 76, as discussed above.

Figure 4D:
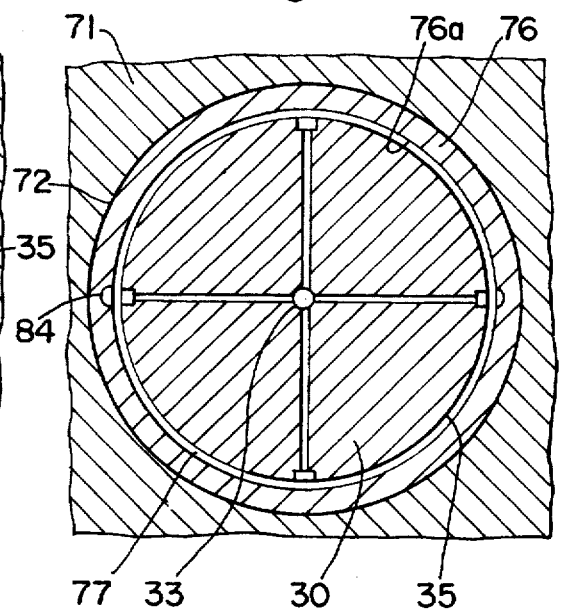
FIG. 4d is a cross-sectional view similar to that shown in FIG. 4a and illustrates an alternative embodiment of the fluid distribution structure of the tool.
Figure 4C:
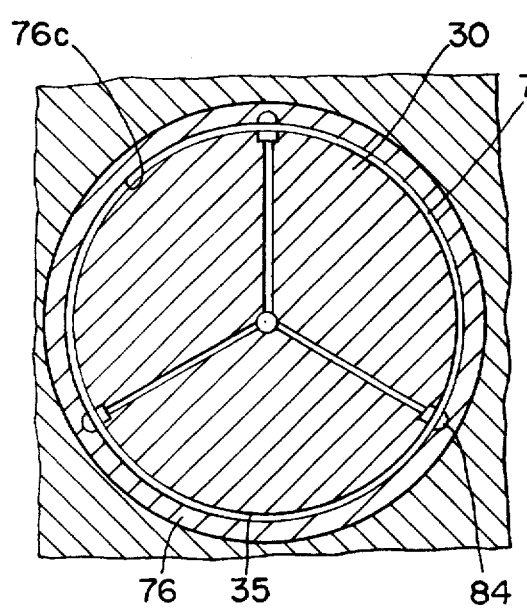
FIG. 4c is a cross-sectional view similar to that shown in FIG. 4a and illustrates an alternative embodiment of the fluid distribution structure of the tool.

When an auxiliary support structure 70 is used to establish a fluid bearing for tool 30, pads (e.g. 42) and raised lands (e.g. 44) can optionally be formed on tool 30, or alternatively, on the inner diameter 176a of bushing 76. FIG. 4a illustrates an embodiment wherein fluid support pads 42 and the corresponding raised lands 44 can be formed on the peripheral surface 30c of tool 30, as illustrated in FIG. 3b above.

Figure 4B:
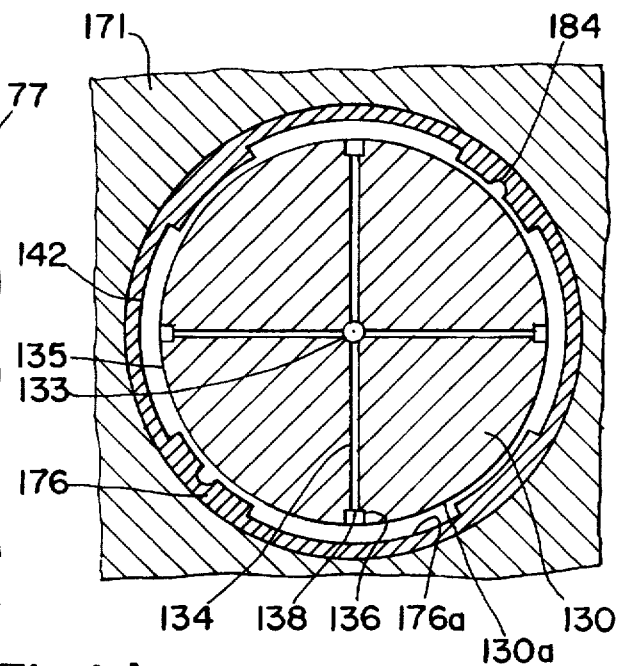
FIG. 4b is a cross-sectional view similar to that shown in FIG. 4a and illustrates an alternative embodiment of the fluid distribution structure of the tool.
Figure 4A:
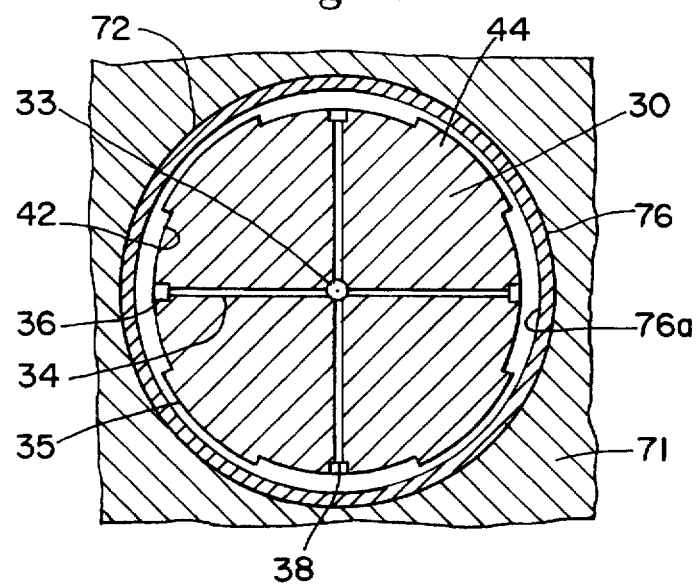
FIG. 4a is a partial, enlarged cross-sectional view of an auxiliary fluid bearing support of FIG. 2 taken along line 4—4 thereof.

FIG. 4b shows an alternative embodiment in which pads 142 can be formed in the inner diameter 176a of a bushing 76 in lieu of the peripheral surface 130a of tool 130. Corresponding raised lands 144 are formed on the inner diameter 176a of bushing 176 similar in configuration and function to lands 44. As tool 130 and a workpiece (e.g., 62) are moved with respect to each other in a longitudinal direction during machining operations (e.g. via longitudinal feeding of the workhead 22 toward the spindle 24), when pads 142 and lands 144 are required, it is preferred that they be provided on the inner diameter 176a of bushing 176. As will be appreciated, substantially the entire effective surface area of a pad should be contained within a bushing for the fluid bearing to optimally achieve and maintain the desired pressure level. As a tool (30) is fed in a longitudinal direction (during machining operations), pad 42 will likewise move. Tolerance for such movement should be designed into the arrangement, such as by providing a sufficient "stroke" of movement tolerance in alignment and relative size of the bushing and corresponding pads. In this way, pad 42 will remain substantially completely encased in a bushing 76 to prevent fluid venting out the bushing chamber 77 without much resistance and the pressure level from decreasing and causing the fluid bearing to weaken or even fail.

As discussed previously, the fluid bearing operates as a system in which pressurized fluid is continually being supplied to the bearing chamber 77 to maintain the desired pressure level as controlled leakage occurs. Fluid can flow axially or circumferentially and drain or leak out of the bushing 76. In some applications, fluid can tend to "drain" in an uncontrolled manner which can hamper cutting operations and make fluid recovery difficult. To control leakage, FIGS. 4b, 4c and 4d illustrate an embodiment in which grooves 84, or 184, can be formed in the inner diameter 76a of bushing 76 and extending longitudinally. The grooves 184 can be formed in the raised lands 144, as seen in FIG. 4b, and sized and configured to enhance evacuation or draining of the fluid at a controlled rate, and/or to allow passage of machining edges (e.g., 48) therethrough, as discussed previously. Moreover, so that an under-pressure is not created at one radial position in chamber 77, which could result in the fluid bearing weakening or failing, the grooves 84 or 184 are preferably symmetrically positioned around the inner diameter of bushing 76 or 176. When pads 142, lands 144, and grooves 184 are provided on the inner diameter 176a of bushing 176, the grooves 184 are preferably formed in lands 144 for best results. Otherwise, undue fluid volumes would be required. If however, the grooves 184 are formed in pads 142, the combined void space to be filled by fluid (the pad 142 and groove 184 together) maybe too large for practically maintaining the desired pressure level with the resulting bearing, and as a result, the bearing could again weaken or even fail due to increased fluid leakage or drainage.

As shown in FIG. 4d, four (4) fluid manifolds 34 can advantageously be utilized to route fluid to the bushing chamber 77. It is contemplated that several (e.g. 2) grooves 84 can be formed and symmetrically positioned in a spaced relation relative to each other about the inner diameter 76a of bushing 76, to facilitate maintaining a relatively constant pressure level in the bushing chamber 77 as tool 30 rotates.

In contrast, as seen in FIG. 4c, when an odd number of fluid manifolds 34 are utilized, an equal number of symmetrically positioned grooves 84 must also be utilized. For example, when three (3) fluid manifolds 34 are utilized to route fluid to the bushing chamber 77, three grooves 84 are preferably equally spaced around the inner diameter 76a of bushing 76 to properly facilitate controlled fluid drainage without undesirably severely disrupting the pressure level in the fluid bearing.

In certain embodiments, a support structure 70 could also be used without bore holes 64 in workpiece 62 or in addition to using bore holes 64 to create one or more transient fluid bearings along the longitudinal length of tool 30. Once the tool 30 is properly positioned, fluid from a pressurized source begins to flow through fluid distribution passageway 32, and more specifically through supply tube 33 which leads to fluid manifolds 34 and cooling tubes 40 and their respective counterbores 36. Fluid exits fluid distribution passageway 32 through flow meters 38 into the bushing chamber 77, to establish the transient fluid bearing that supports and centers tool 30 while it machines at least one other bore hole 64 position either proximal or distal to the transient fluid bearing. Fluid can flow axially or circumferentially and drain or leak out of bearing chamber 77.

As the workpiece 62 is slidably inserted around tool 30, the steps for establishing another transient fluid bearing can be repeated which allow for a series of machining operations to take place without reconfiguring the structure necessary to supply fluid to maintain a fluid bearing.

Having shown and described preferred embodiments to the present invention, further adaptations of the fluid bearing tool and a method of forming transient fluid bearings during machining operations as described herein can be accomplished by appropriate modifications by one of ordinary skill in the industry without departing from the scope of the present invention. Several such potential modifications have been mentioned and others will be apparent to those skilled in the art. Accordingly, the scope of the present invention should be considered in the terms of the following claims and is understood not to be limited in the details, structure and operations shown and described in its specifications and drawings.

We claim:

1. An improved tool for machining of a workpiece having a plurality of substantially aligned openings which must be worked, said tool configured for use with a source of fluid, and comprising:

a body having a longitudinal length, proximal and distal ends, a peripheral surface, and an engaging device for rotatably connecting said body in a cantilevered arrangement adjacent its proximal end to a machine for rotating machining operations;

fluid distribution channels formed in said peripheral surface in a predetermined arrangement, said channels having at least one flow control device;

a passage for placing said channels in fluid communication with said source of pressurized fluid in use;

a machining surface on at least a portion of said peripheral surface for machining an opening in a workpiece in use;

at least one bearing surface formed on said peripheral surface, with at least some of said fluid distribution channels being disposed in said bearing surface, and at least one machining surface located adjacent and distally of said bearing surface, whereby pressurized fluid provided through said fluid distribution channels in use enable establishment of a fluid bearing between said tool and an opening in said workpiece.

2. The tool of claim 1 wherein said machining surface comprises a boring edge.

3. The tool of claim 1 wherein said machining surface comprises a cutting edge.

4. The tool of claim 1 wherein a plurality of bearing surfaces are formed on said peripheral surface.

5. The tool of claim 4 wherein said bearing surfaces are longitudinally spaced apart along said longitudinal length of said tool body.

6. An improved tool for machining of a workpiece having a plurality of substantially aligned openings which must be worked, said tool configured for use with a source of fluid, and comprising:

a body having a longitudinal length, proximal and distal ends, a peripheral surface, and an engagement device for rotatably connecting said body in a cantilevered arrangement adjacent its proximal end to a machine for rotating machining operations;

fluid distribution channels formed in said peripheral surface in a predetermined arrangement;

a passage for placing said channels in fluid communication with said source of pressurized fluid in use;

a plurality of machining surfaces on at least a portion of said peripheral surface for machining an opening in a workpiece in use; and at least one bearing surface formed on said peripheral surface, with at least some of said fluid distribution channels being disposed in said bearing surface, whereby pressurized fluid provided through said fluid distribution channels in use enable establishment of a fluid bearing between said tool and an opening in said workpiece.

7. The tool of claim 1 wherein said peripheral surface further comprises fluid distribution openings for cooling and cleaning of said machining surfaces in use.

8. An improved combination for boring or similar machining of a workpiece having a plurality of substantially aligned openings which must be worked with a machine station, said combination comprising:

a tool having a longitudinal length, distal and proximal ends, a body having a cutting edge, a peripheral surface having at least one machining surface and at least one bearing surface formed thereon, and a plurality of fluid distribution channels formed in said peripheral surface adjacent said bearing surface;

a machine spindle for rotating machining operations having a proximal and distal end and an engaging device for securing said tool in a cantilevered arrangement adjacent its distal end to said machine;

a workhead to be machined by said tool;

a feeding arrangement for moving said workhead relative to said spindle; and a movable auxiliary bearing support fixture independent of said workpiece and said spindle.

9. The combination of claim 8 wherein said spindle is configured to route fluid through a predetermined spindle fluid supply.

10. An improved method for machining a workpiece having a plurality of substantially aligned openings which must be worked, said method comprising the steps of:

(a) providing a rotary tool for use with a machine spindle for rotatable machining operations, said tool having a longitudinal length, distal and proximal ends, an engaging device for securing said tool in a cantilevered manner adjacent its proximal end to said spindle, and a body having a cutting edge, a peripheral surface having at least one machining surface and at least one bearing surface formed thereon, and a plurality of fluid distribution channels formed in said peripheral surface adjacent said bearing surface, said fluid distribution channels having at least one flow control device;

(b) connecting said rotary tool with a machine spindle and providing fluid communication between a source of pressurized fluid and said distribution channels of said tool;

(c) machining an opening of a workpiece with said rotary tool;

(d) feeding said tool into a machined opening of said workpiece to align said bearing surface of said tool with said machined opening; and (e) forming a fluid bearing between said tool and said machined opening.

11. The method for machining a workpiece of claim 10 wherein said method comprises repeating step (c) in another opening of said workpiece while said tool is supported by the fluid bearing formed between said tool and said workpiece.

12. The method for machining a workpiece of claim 10 wherein said method further comprises repeating steps (c)–(e) to thereby form a plurality of fluid bearings between said tool and said workpiece.

13. The method for machining a workpiece of claim 10 wherein said method further comprises providing an auxiliary bearing support fixture independent of said workpiece and said spindle, said fixture having a bore of predetermined diameter.

14. The method for machining a workpiece of claim 13 wherein said method further comprises aligning said bore of said bearing support fixture with a bearing surface of said tool to form a fluid bearing.

15. The method for machining a workpiece of claim 10 wherein said method further comprises providing coolant distribution channels in said peripheral surface and adjacent said machining surface.

16. The method for machining a workpiece of claim 15 wherein said method further comprises providing fluid under pressure via said coolant distribution channels to said machining surface in use.

17. The tool of claim 13 wherein adjacent machining surfaces separated by an intermediate bearing surface.

18. An improved method for machining a workpiece having a plurality of substantially aligned openings which must be worked, said method comprising the steps of:

(a) providing a rotary tool for use with a machine spindle for rotatable machining operations, said tool having a longitudinal length, distal and proximal ends, an engaging device for securing said tool in a cantilevered manner adjacent its proximal end to said spindle, and a body having a cutting edge, a peripheral surface having at least one machining surface and at least one bearing surface formed thereon, a plurality of fluid distribution channels formed in said peripheral surface adjacent said bearing surface, and an auxiliary bearing support fixture independent of said workpiece and said spindle, said fixture having a bore of predetermined diameter;

(b) connecting said rotary tool with a machine spindle and providing fluid communication between a source of pressurized fluid and said distribution channels of said tool;

(c) machining an opening of a workpiece with said rotary tool;

(d) feeding said tool into a machined opening of said workpiece to align said bearing surface of said tool with said machined opening; and (e) aligning said bore of said bearing support fixture with a bearing surface of said tool; and (f) forming a fluid bearing between said tool and said machined opening.

19. The tool of claim 1, wherein each of said fluid distribution channels have a flow control device.

* * * * *

UNITED STATES PATENT AND TRADEMARK OFFICE
CERTIFICATE OF CORRECTION

PATENT NO. : 5,540,526
DATED : July 30, 1996
INVENTOR(S) : Hyatt, et al.

It is certified that error appears in the above-indentified patent and that said Letters Patent is hereby corrected as shown below:

Column 14, claim 17, line 31, replace "13" with --6--.

Signed and Sealed this

Tenth Day of December, 1996

Attest:

BRUCE LEHMAN

Attesting Officer       Commissioner of Patents and Trademarks